United States Patent
Brüse

(10) Patent No.: US 11,643,617 B2
(45) Date of Patent: *May 9, 2023

(54) PALM OIL WITHOUT UNWANTED CONTAMINANTS

(71) Applicant: Cargill, Incorporated, Wayzata, MN (US)

(72) Inventor: Falk Brüse, Drensteinfurt (DE)

(73) Assignee: Cargill, Incorporated, Wayzata, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/966,208

(22) PCT Filed: Feb. 7, 2019

(86) PCT No.: PCT/US2019/016998
§ 371 (c)(1),
(2) Date: Jul. 30, 2020

(87) PCT Pub. No.: WO2019/157143
PCT Pub. Date: Aug. 15, 2019

(65) Prior Publication Data
US 2021/0047584 A1    Feb. 18, 2021

(30) Foreign Application Priority Data
Feb. 7, 2018    (EP) .................... 18155454

(51) Int. Cl.
C11B 3/10 (2006.01)
A23D 9/04 (2006.01)
C11B 3/00 (2006.01)
B01J 20/08 (2006.01)

(52) U.S. Cl.
CPC ............ *C11B 3/10* (2013.01); *A23D 9/04* (2013.01); *B01J 20/08* (2013.01); *C11B 3/001* (2013.01)

(58) Field of Classification Search
CPC .......... C11B 3/001; C11B 3/10; B01J 20/041; B01J 20/08
See application file for complete search history.

(56) References Cited

U.S. PATENT DOCUMENTS 3,862,054 A * 1/1975 Sokolsky ............... C11B 3/10
                                                                        502/84
6,844,458 B2 * 1/2005 Copeland ............... A23D 9/00
                                                                        554/175
2012/0259133 A1    10/2012 Homma
2020/0362265 A1 * 11/2020 Bruse ................. C11B 3/006

FOREIGN PATENT DOCUMENTS

JP    2016040366 A *    3/2016    ............... C11B 3/10
RU    2360952 C2    7/2009

OTHER PUBLICATIONS

JP2016040366 A, Tsukahara Daiske et al., Decolorant for refined oil and fat, English translation, 18 pages (Year: 2016).*
The effects of Physical Refining on the Formation of 3-monochloropropane-1, 2-diol esters in relation to palm oil minor components. Food Chemistry, Elsevier LTD., NL, vol. 135, No. 2, Apr. 30, 2012, pp. 799-805.
Stryzhenok A.A. "Improving the technology of adsorption refining of vegetable oils. Thesis paper", Krasnodar, 2015, p. 50.

* cited by examiner

*Primary Examiner* — Yate' K Cutliff

(57) ABSTRACT

The present invention relates to a process reducing in a palm oil the content of unwanted propanol components selected from free chloropropanols, chloropropanol fatty acid esters and combinations of two or more thereof, and the process is comprising a bleaching step using an adsorbent comprising alumina oxide wherein the content of alumina oxide is not more than 9.5%, preferably the adsorbent is having a content of earth alkali oxides of from 12 to 27%.

13 Claims, No Drawings

PALM OIL WITHOUT UNWANTED CONTAMINANTS

CROSS REFERENCE TO RELATED APPLICATIONS

This application is a national phase application of PCT/US2019/016998, filed 7 Feb. 2019, entitled Palm Oil Without Unwanted Contaminants, which claims the benefit of priority to European Provisional Application No. 18155454.4, filed 7 Feb. 2018, entitled Palm Oil Without Unwanted Contaminants, which are hereby incorporated by reference in their entirety.

FIELD OF THE INVENTION

Use of bleaching step using an adsorbent containing not more than 9.5% alumina oxide to reduce unwanted contaminants, such as unwanted propanol components in deodorized palm oil.

BACKGROUND OF THE INVENTION

Crude oils, as extracted from their original source, are not suitable for human consumption due to the presence of high levels of contaminants—such as free fatty acids, phosphatides, soaps and pigments—which may be either toxic or may cause an undesirable color, odor or taste. Crude oils are therefore refined before use. The refining process typically consists of the following major steps: degumming and/or alkali refining, bleaching and deodorizing. An oil obtained after completion of the refining process (called a "NBD" or "RBD oil") is normally considered suitable for human consumption and may therefore be used in the production of any number of foods and beverages.

Unfortunately, it has now been found that the refining process itself contributes to the introduction, of high levels of unwanted propanol components into the refined oil.

A lot of efforts have been taken to reduce the levels of these unwanted propanol components such as free chloropropanols, chloropropanol fatty acid esters, free epoxypropanols, epoxypropanol fatty acid esters, and combinations thereof. A lot of diverse processes have been developed in order to avoid, to mitigate or to reduce the content of these unwanted propanol components.

These diverse processes each have been concerned with amending the process conditions (e.g. process time, process temperature etc.) of at least one or more of the standard refining steps. These adaptations of the standard process conditions, may have a negative impact on other quality parameters of the oil such as color, taste and oxidation stability. A well-known procedure to avoid formation of unwanted chloropropanols is the reduction of the deodorization time and/or temperature. Usually, deodorization time and/or temperature in the standard process is selected to get the most promising results in respect of break-down and/or removal of color molecules, off-flavors and oxidation products. However, selecting a process with a lower deodorization temperature and/or shorter time may have to be compensated by further adaptations to the other process steps in oil refining process.

Yet, there is still a need for a process allowing to obtain a palm oil with low or negligible amounts of these unwanted propanol components, while maintaining high quality in all other aspects of the oil.

The current invention provides such a process.

SUMMARY OF THE INVENTION

The current invention relates to a process for preparing purified vegetable oil selected from palm oil, palm oil based material and combinations thereof, and the process is comprising the
  a) Optionally degumming of a vegetable oil, optionally in presence of acid,
  b) contacting a vegetable oil that has not been subjected to a deodorization process with an adsorbent comprising alumina oxide and wherein the adsorbent has a content of alumina oxide of not more than 9.5%, preferably not more than 9%, more preferably not more than 8.5% (wt %).

It further relates to the use of an adsorbent to mitigate or eliminate the formation of chloropropanol fatty acid esters in a process for producing deodorized vegetable oils selected from palm oil, palm oil based material and combinations thereof and wherein the adsorbent is having a content of alumina oxide not more than 9.5% (w/w).

DETAILED DESCRIPTION

The current invention relates to a process for preparing purified vegetable oil selected from palm oil, palm oil based material and combinations thereof, and the process is comprising
  a) Optionally degumming of a vegetable oil, optionally in presence of acid,
  b) contacting a vegetable, optionally degummed, oil that has not been subjected to a deodorization process with an adsorbent comprising alumina oxide and wherein the adsorbent has a content of alumina oxide of less than 9.5%, preferably less than 9%, more preferably not more than 8.5% (wt %).

Preferably the content of alumina oxide is in the range of 0.5 to 9%, 1 to 9%, and a more preferred range is from 2 to 8.5%. Further suitable levels likewise are in the range of 2 to 4%, 2.5 to 6.3%, 3 to 5% or 4 to 7%, or 2.5 to 6.5%.

Without being bound by any theory, the process according to the present invention, and in particular the contacting of the vegetable oil with an adsorbent having a content of alumina oxide of less than 9.5%, will allow to remove or to reduce the content of precursors of chloropropanol compounds. Due to this reduction or removal of these precursors, there is less of a need to lower the deodorization temperature and thus avoiding formation of chloropropanol compounds at high temperatures. The lowered, reduced or eliminated content of precursors of chloropropanol compounds will have a positive impact on the reduction or elimination of formation of chloropropanol compounds at high temperatures.

The vegetable oil is selected from palm oil, palm oil based material, any palm variety with altered fatty acid composition versus the original palm variety, and combinations thereof, whereby the palm oil based material refers to palm oil which has been fractionated, hydrogenated, chemically interesterified, enzymatic interesterified or a combination of one or more of these treatments. The palm variety refers to any palm variety with altered fatty acid composition versus the original palm variety, such as high oleic palm varieties, obtained by natural selection or by genetic modifications (GMO). Preferably the palm based material is fractionated palm oil and fractions such as stearin and olein fractions (single as well as double fractionated), palm mid fractions and blends of palm oil and/or its fractions are included as well. Preferably the palm based material is fractionated palm oil, fractions and combinations thereof. Preferably the vegetable oil is selected from palm oil, a palm oil fraction or a combination thereof.

The vegetable oil selected from palm oil, palm oil based material and combinations thereof and which is applied in the process of the present invention, has not been subjected to any deodorization step. The vegetable oil may be crude, or refined oil in so far it has not been subjected to a deodorization step. The vegetable oil may be degummed, and degumming may take place in presence of an acid. Preferably the vegetable oil, optionally degummed, oil is neutralized in presence of alkali.

The process of the present invention provides a purified vegetable oil selected from palm oil, palm oil based material and combinations thereof wherein the content of process contaminants, selected from the group consisting of free chloropropanols, chloropronanol fatty acid esters, and combinations of two or more thereof, is reduced, or eliminated. Without being bound by any theory, the process according to the present invention, will allow to remove or to reduce the content of precursors of these chloropropanol compounds.

Any of a variety of degumming processes, optionally in presence of acid, and known in the art may be used. One such process (known as "water degumming") includes mixing water containing acid such as citric acid and/or phosphoric acid, with the crude oil and separating the resulting mixture into an oil component and an oil-insoluble hydrated phosphatides component, sometimes referred to as "wet gum" or "wet lecithin".

In another aspect of the invention, the adsorbent is non-chemically activated, i.e. physically activated. More in particular, the adsorbent is not acid-activated. Furthermore, the adsorbents in the present invention are naturally occurring minerals that have been activated by physical means. They are not activated by chemical means. Without being limited to a specific physical activation of the adsorbent, a suitable physical activation may include or consist of a wetting, milling, filtration and thermal treatment, including drying. The thermal treatment may be of any type and may for example be a drying step, a microwave treatment or a heat treatment. In fact, the physically activated adsorbent may be more active than the corresponding natural occurring minerals or bleaching clays.

In another aspect of the invention, the adsorbent is having a content of earth alkali oxides of from 12 to 27% (wt %), from 15 to 25% (wt %), from 18 to 24% (wt %) or from 19 to 23% (wt %). Typical content may range from 13 to 24%, from 17 to 24%, from 19% to 24%, from 20 to 24%. More specifically these earth alkali oxides are magnesium oxides and calcium oxides, all expressed in wt %.

In another aspect of the invention the adsorbent is having a content of magnesium oxide from 11 to 25%, from 14 to 24%, from 17 to 23%, from 18 to 21% (wt %), from 19 to 22% (wt %).

Furthermore, preferably the adsorbent is having a pH of at least 6, preferably at least 7. Typically the pH is within the range of 6 to 8.5.

In another aspect of the invention, the adsorbent is added to the vegetable oil selected from palm oil, palm oil based material and combinations thereof in an amount of more than 1%, more than 1.2%, more than 1.3%, more than 1.35%, more than 1.5%, more than 2%, more than 2.5%, equal to or more than 3%, equal to or more than 4%, equal to or more than 4.5%, equal to or more than 5%, more than 6%, more than 8%, more than 10%. The percentage is expressed in w/w.

Typically, the contacting temperature (is bleaching temperature) whereby the vegetable liquid oil is contacted with the adsorbent, is in the range of from 70 to 110° C., in the range of 80 to 100° C., in the range of 85 to 95° C.

In another aspect of the invention, the process is comprising a treatment of the vegetable oil selected from palm oil, palm oil based material and combinations thereof in presence of a base, preferably an alkaline solution. This treatment in the presence of a base can occur anywhere in the process of the present invention. It may occur before, after, during and/or between the steps of the process of the present invention. Most commonly, the treatment in presence of alkaline solution is a neutralization step. If so desired, crude or degummed oil may be treated with alkaline solution. In such alkali refining step (=neutralization step), the oil is commonly mixed with a hot, aqueous alkali solution, producing a mixture of partially refined or "neutral" oil and soapstock. The soapstock is then separated off and the partially refined oil is delivered to the next refining step.

In an aspect of the present invention the process is comprising the following steps without any particular order:
a) contacting a vegetable oil that has not been subjected to a deodorization process with an adsorbent comprising alumina oxide and wherein the adsorbent has a content of alumina oxide of less than 9.5%, preferably less than 9%, more preferably not more than 8.5% (wt %),
b) treating the vegetable oil, optionally deodorized vegetable oil, with a base, preferably with alkali solution.

In another aspect of the invention, the vegetable oil treated with the adsorbent is deodorized at a temperature below 265° C., below 260° C., between 180° C. and 250° C., between 200° C. and 230° C., between 210° C. and 230° C., from 220° C. to 225° C. Due to the reduction or removal of the precursors of chloropropanol compounds in the process steps prior to the deodorization, there is less of a need to lower the deodorization temperature. Yet, the process of the present invention may include a deodorization step performed at a temperature lower than the temperature of a standard deodorization step that is well-known in the art.

The deodorising process step and its many variations and manipulations are well known in the art. Preferably, it will include introducing the oil into a deodoriser and contacting it with steam to vaporize and drive off free fatty acids (FFAs) and other volatile impurities, resulting in a deodorised oil and a vapour stream.

The deodoriser may be any of a wide variety of commercially available deodorizing systems, including both multi-chamber deodorisers (such as those sold by Krupp of Hamburg, Germany; De Smet Group, S A. of Brussels, Belgium; Gianazza Technology s.r.l. of Legnano, Italy; Alfa Laval AB of Lund, Sweden, or others) and multi-tray deodorisers (such as those sold by Krupp, DeSmet Group, S.A., and Crown Ironworks of the United States).

The deodoriser is desirably maintained at an elevated temperature and a reduced pressure to better volatilise the FFAs and other volatile impurities. Most often, the deodoriser will be maintained at a pressure of no greater than 10 mm Hg. Preferably, it will be maintained at a pressure of no greater than 5 mm Hg, e.g., 1-4 mm Hg.

A quantity of steam is delivered to the deodoriser, e.g. through low-pressure steam lines (at 1-5 Bar for example), and is then sprayed into the oil. As the steam, which may be superheated, bubbles through the oil, it will help strip off its FFAs and other volatile impurities. The flow rate of steam through the oil will vary depending on the nature and quality of the oil being deodorised and the pressure and temperatures in the deodoriser. Generally, though, steam flow rates in the order of 0.7-2.5 weight percent (wt. %) of the oil flow rates should suffice for most common processing conditions. This produces a steam-containing vapour stream which is delivered from the deodoriser to one or more condensers.

In another aspect of the invention processing steps such as re-bleaching of the deodorized oil in presence of a bleaching agent and subsequent re-deodorization at a temperature below 200° C. are optional process steps and may even further contribute to the purification of the vegetable oil selected from palm oil, palm oil based material and combinations thereof. The adsorbent used in the re-bleaching can be activated (non-chemically (physically), chemical (e.g. acid)) or a natural bleaching earth or combinations thereof.

In another aspect of the invention the process is comprising the sequence of the following steps and in the following order:
a) Optionally degumming of the vegetable oil, optionally in presence of acid,
b) Neutralising the vegetable oil, optionally the degummed vegetable oil in presence of alkaline solution,
c) Bleaching the alkali treated oil in presence of an adsorbent wherein the content of alumina oxide is not more than 9.5%,
d) Deodorizing the bleached oil at a deodorization temperature below 265° C.,
e) Optionally re-bleaching the deodorized oil in presence of a bleaching agent,
f) Optionally re-deodorizing the deodorized or re-bleached oil at a deodorization temperature below 200° C.

The deodorization temperature of step d) is below 265° C., below 260° C., between 180° C. and 250° C., between 200° C. and 230° C., between 210° C. and 230° C., from 220° C. to 225° C. The deodorization temperature of the optional step f) is below 200° C., between 130° C. and 200° C., between 150° C. and 195° C., between 170° C. and 180° C., preferably from 160 to 195° C.

The process according to the present invention may further comprise a re-bleaching step. This bleaching step is performed in presence of a bleaching agent. The adsorbent used in the re-bleaching can be an activated (non-chemically (physically), a chemical (e.g. acid) or a natural bleaching earth or combinations thereof. The bleaching temperature is in the range of 70 to 110° C.

The process according to the present invention may further comprise a re-deodorization step. This further deodorization step is performed at a deodorization temperature below 200° C., between 130° C. and 200° C., between 150° C. and 195° C., between 170° C. and 180° C., preferably from 160 to 195° C.

The process of the current invention allows to reduce the total content of the process contaminants selected from the group consisting of, free chloropropanols, chloropronanol fatty acid esters, and combinations of two or more thereof, by at least 40%, at least 50%, at least 60%, preferably it is reduced by at least 70%, at least 80%, at least 90% and even up to 95%, compared with a standard refined oil i.e. a physical refined palm oil, obtained by a standard refining process that is using max 1.5% of an acid-activated bleaching earth in the bleaching step and a deodorization step at 245° C. for 3 h, and it thus allows obtaining the purified vegetable oil selected from palm oil, palm oil based material and combinations thereof.

In another aspect of the invention it has been shown that by applying the process of the invention and specifically including the treatment in presence of a base, typically an alkali solution, the total content of the process contaminants selected from the group consisting of, free chloropropanols, chloropronanol fatty acid esters, and combinations of two or more thereof, is reduced by at least 50%, at least 60%, at least 70%, preferably it is reduced by at least 75%, at least 85%, at least 95% and even up to 99% compared with a standard refined oil i.e. a physical refined palm oil, obtained by a standard refining process that is using max 1.5% of an acid-activated bleaching earth in the bleaching step and a deodorization step at 245° C. for 3 h, and it thus allows obtaining the purified vegetable oil selected from palm oil, palm oil based material and combinations thereof.

Unless specified otherwise, the content of free chloropropanols, chloropropanol fatty acid esters and mixture of two or more thereof is determined by using Method DGF Standard Methods Section C (Fats) C-VI 18(10) (Assay B)

The process of the present invention allows obtaining deodorized oils, particular palm oil or palm based material or combinations thereof according to specifications in respect of color (red & yellow), flavor quality and oxidation stability. The color red (Lovibond 5¼) is max 3, color yellow (Lovibond 5¼) is max 30, the flavor quality score is at least 9 (10 being an excellent quality and 1 being the worst quality) and the oxidative stability expressed as OSI (at 120° C.) is at least 10 hours. Furthermore the obtained deodorized palm oil, palm oil based material and combinations thereof has a significant reduced content of free chloropropanols, chloropropanol fatty acid esters and mixture of two or more thereof.

In one aspect of the invention, the physical refining process using an adsorbent having a content of alumina oxide of less than 9.5%, allows obtaining deodorized palm oil or palm based material or combinations thereof, with less than 2000 ppb of free chloropropanols, chloropropanol fatty acid esters and mixture of two or more thereof. This may correspond to a reduction of at least 50%, up to at least 60% compared with a standard refined oil i.e. a physical refined palm oil, obtained by a standard refining process that is using max 1.5% of an acid-activated bleaching earth in the bleaching step and a deodorization step at 245° C. for 3 h. More specifically, the obtained deodorized palm oil or palm based material or combinations thereof has a content of less than 1980 ppb of free chloropropanols, chloropropanol fatty acid esters and mixture of two or more thereof, by using the process of the present invention and contacting the oil with an adsorbent having a content of alumina oxide of less than 9.5% and having a content of earth alkali oxides of from 12 to 27% (wt %).

In one aspect of the invention, the refining process, including an alkali neutralization step and using an adsorbent having a content of alumina oxide of less than 9.5 allows obtaining deodorized palm oil or palm based material or combinations thereof, with less than 650 ppb of free chloropropanols, chloropropanol fatty acid esters and mixture of two or more thereof. This may correspond to a reduction of at least 80%, up to at least 87% compared with a standard refined oil i.e. a physical refined palm oil, obtained by a standard refining process that is using max 1.5% of an acid-activated bleaching earth in the bleaching step and a deodorization step at 245° C. for 3 h. More specifically, the obtained deodorized palm oil or palm based material or combinations thereof has a content of less than 630 ppb of free chloropropanols, chloropropanol fatty acid esters and mixture of two or more thereof, by using the process of the present invention and contacting the oil with an adsorbent having a content of alumina oxide of less than 9.5% and having a content of earth alkali oxides of from 12 to 27% (wt %).

In another aspect of the invention, a refining process, including an alkali neutralization step and using an adsorbent having a content of alumina oxide of less than 9.5%, allows obtaining deodorized palm oil or palm based material or combinations thereof, with less than 550 ppb of free chloropropanols, chloropropanol fatty acid esters and mixture of two or more thereof. This may correspond to a reduction of at least 80%, up to 88% compared with a standard refined oil i.e. a physical refined palm oil, obtained by a standard refining process that is using max 1.5% of an acid-activated bleaching earth in the bleaching step and a deodorization step at 245° C. for 3 h. It can be shown that by increasing the amount of the adsorbent from 1.5% over 3% to 4.5%, the content of free chloropropanols, chloropropanol fatty acid esters and mixture of two or more thereof is significantly reduced, from about 500 ppb, to about 330 ppb to less than 150 ppb.

Finally, the present invention relates to the use of an adsorbent to mitigate or eliminate the formation of chloropropanol fatty acid esters in a process for producing deodorized vegetable oils selected from palm oil, palm oil based material and combinations thereof and wherein the adsorbent is having a content of alumina oxide not more than 9.5%.

The present invention relates to the use wherein the formation of chloropropanol fatty acid esters is mitigated or eliminated by mitigating or eliminating the content of precursors of chloropropanol fatty acid esters in a process for producing deodorized vegetable oils selected from palm oil, palm oil based material and combinations thereof and wherein the adsorbent is having a content of alumina oxide not more than 9.5%.

In one aspect of the present invention it relates to the use of an adsorbent to mitigate or eliminate the content of precursors of chloropropanol fatty acid esters in a process for producing deodorized vegetable oils selected from palm oil, palm oil based material and combinations thereof and wherein the adsorbent is having a content of alumina oxide not more than 9.5%.

More in particular, it relates to the use wherein the adsorbent is having a content of earth alkali oxides from 12 to 27%, from 15 to 25% (wt %), from 18 to 24% (wt %) or from 19 to 23% (wt %). Typical content may range from 13 to 24%, from 17 to 24%, from 19% to 24%, from 20 to 24%.

Furthermore in another aspect of the invention, it relates to the use wherein the adsorbent is non-chemically activated.

In yet another aspect of the invention it relates to the use wherein the adsorbent is having a content of magnesium oxide from 11 to 25%, from 14 to 24%, from 17 to 23%, from 18 to 21% (wt %), from 19 to 22% (wt %).

It further relates to the use of the present invention wherein the adsorbent is applied in an amount of more than 1%, more than 1.2%, more than 1.3%, more than 1.35%, more than 1.5%, more than 2%, more than 2.5%, equal to or more than 3%, equal to or more than 4%, equal to or more than 4.5%, equal to or more than 5%, more than 6%, more than 8%, more than 10%. The percentage is expressed in w/w.

Finally, it relates to the use wherein the adsorbent is used in a bleaching step of the process for producing deodorized vegetable oils selected from palm oil, palm oil based material and combinations thereof, more preferably in a bleaching step of a process further comprising optionally a degumming, optionally in presence of acid, and a treatment in presence of alkaline solution.

In fact, the use of the present invention allows to mitigate or eliminate the formation of chloropropanol fatty acid esters by at least 40%, at least 50%, at least 60%, preferably it is reduced by at least 70%, at least 80%, at least 90% and even up to 95%, and even up to 99% in comparison to the reference, a standard refined oil i.e. a physical refined palm oil, using max 1.5% of an acid-activated obtained by a standard refining process that is using max 1.5% of an acid-activated bleaching earth bleaching earth in the bleaching step and a deodorization step at 245° C. for 3 h.

The present invention is illustrated by the following non-limiting examples.

EXAMPLES

Method of Analysis

The 3-MCPD content in the deodorized oil was measured according to Method DGF Standard Methods Section C (Fats) C-VI 18(10) (assay B).

Color, red and yellow, was measured according to the Lovibond method (official AOCS method Cc13e-92). A 5¼ inch glass measuring cell was used.

The oxidative stability of the oil is assessed by measuring of the induction time which characterizes the resistance of the oil to oxidation at a specified temperature. The induction time is expressed as Oil Stability Index (OSI). A suitable method is the measurement using a Rancimat equipment (Metrohm) according to AOCS method Cd12b-92.

The oils were tasted and evaluated for their flavor quality. A flavor quality score was given according to AOCS method Cg 2-83, where a flavour quality score of 10 is an excellent quality and a flavour quality score of 1 is the worst.

Comparative Example—Standard Physical Refining of Palm Oil

Crude palm oil was bleached at 90° C. for 30 min, using 1.5% acid activated bleaching earth (characteristics specified in table 1). After removing the bleaching earth, the oil was subsequently deodorized at a temperature of 245° C. during 3 h at pressure of 3 mbar, using 1% of sparge steam per hour.

Color (red & yellow), flavor quality and oxidation stability of the resulting deodorized oils was according to specifications, i.e. Color red (Lovibond 5¼) of max 3, color yellow (Lovibond 5¼) of max 30, a flavor quality of at least 9 and an OSI (at 120° C.) of at least 10 hours.

TABLE 1

| Activation | Acid activated |
|---|---|
| bleaching earth characteristics | |
| $SiO_2$ | 71.4% |
| $Al_2O_3$ | 11.8% |
| $Fe_2O_3$ | 4% |
| CaO | 3.5% |
| MgO | 1.1% |
| pH | 3.1 |

TABLE 1-continued

| Activation | Acid activated |
|---|---|
| Oil analysis after deodorization | |
| 3-MCPD | 4780 ppb |

Example 1

Crude palm oil was bleached at 90° C. for 30 min using 4.5% non-chemically activated bleaching earth (characteristics specified in table 2). After removing the bleaching earth, the oil was subsequently deodorized at a temperature of 245° C. during 3 h at pressure of 5 mbar, using 1% of sparge steam per hour.

Color (red & yellow), flavor quality and oxidation stability of the resulting deodorized oils was according to specifications; same as for the comparative example.

TABLE 2

| Activation | non-chemically activated |
|---|---|
| bleaching earth characteristics | |
| $SiO_2$ | 57.4% |
| $Al_2O_3$ | 2.6% |
| $Fe_2O_3$ | 13.7% |
| CaO | 0.8% |
| MgO | 19.1% |
| pH | 8.5 |
| Oil analysis after deodorization | |
| 3-MCPD | 1950 ppb |

Example 2

Crude palm oil was acid degummed during 2 h using 1 ml/kg of a citric acid solution (50%) at 80° C., then neutralized (16% NaOH solution added with an excess of 10% over FFA (free fatty acids) content in oil). Washing was done with 5% water and separation on a centrifuge.

The neutralized oil was bleached at 90° C. for 40 min using 1.4% non-chemically activated bleaching earth (characteristics specified in table 3). After removing the bleaching earth, the oil was subsequently deodorized at a temperature of 235° C. during 40 min at pressure between 2 and 5 mbar, using about 1% of sparge steam.

Color (red & yellow), flavor quality and oxidation stability of the resulting deodorized oils was according to specifications (same as in comparative example).

TABLE 3

| Activation | non-chemically activated |
|---|---|
| bleaching earth characteristics | |
| $SiO_2$ | 56.3% |
| $Al_2O_3$ | 6.2% |
| $Fe_2O_3$ | 2.1% |
| CaO | 1.3% |
| MgO | 22.3% |
| pH | 7 |
| Oil analysis after deodorization | |
| 3-MCPD | 610 ppb |

Example 3

Crude oil was neutralized in a settling tank at 65-70° C. using 1.05 equivalents of 16% NaOH solution (related to FFA content of the crude oil). After separating the oil was washed with 10% water in the same settling tank.

The neutralized oil was bleached at 85° C. for 30 min using bleaching earth (type and dosage specified in table 4). After removing the bleaching earth, the oil was subsequently deodorized at a temperature of 225° C. during 3 h at pressure between 2 and 5 mbar, using 1% of sparge steam per hour.

Color (red & yellow), flavor quality and oxidation stability of the resulting deodorized oils was according to specifications (same as comparative example).

TABLE 4

| | Comparative Example 3.1 | Example 3.2 | Example 3.3 | Example 3.4 |
|---|---|---|---|---|
| Activation | Acid activated | non-chemically activated (the same for 3.2, 3.3 and 3.4) | | |
| bleaching earth characteristics | | | | |
| $SiO_2$ | 71.4% | 57.4% | | |
| $Al_2O_3$ | 11.8% | 2.6% | | |
| $Fe_2O_3$ | 4% | 13.7% | | |
| CaO | 3.5% | 0.8% | | |
| MgO | 1.1% | 19.1% | | |
| pH | 3.1 | 8.5 | | |
| Bleaching clay dosage (w/v) | 4.5% | 1.5% | 3% | 4.5% |
| Oil analysis after deodorization | | | | |
| 3-MCPD | 1150 ppb | 510 ppb | 330 ppb | 140 ppb |

The invention claimed is:

1. A process for preparing purified vegetable oil selected from palm oil, palm oil based material and combinations thereof, and the process is comprising the following steps:
    a) optionally degumming of a vegetable oil, optionally in presence of acid,
    b) contacting the vegetable oil with an adsorbent comprising alumina oxide and wherein the adsorbent has a content of alumina oxide ($Al_2O_3$) of not more than 9.5 wt %, wherein the vegetable oil is optionally a degummed vegetable oil;
    wherein the vegetable oil has not been subjected to a deodorization process.

2. The process according to claim 1 wherein the adsorbent is non-chemically activated.

3. The process according to claim 1 wherein the adsorbent is having a content of earth alkali oxides of from 12 to 27 wt %.

4. The process according to claim 1 wherein the adsorbent is having a content of magnesium oxide from 11 to 25 wt %.

5. The process according to claim 1 wherein the adsorbent is added to the vegetable oil in an amount of more than 1.2% w/w.

6. The process according to claim 1 wherein the process is comprising a treatment of the vegetable oil in presence of alkaline solution.

7. The process according to claim 1 wherein the process is comprising the sequence of the following steps:
    a) optionally, degumming of the vegetable oil, optionally in presence of acid,
    b) neutralizing the vegetable oil in presence of alkaline solution, wherein the vegetable oil is optionally a degummed vegetable oil, c) bleaching the alkali treated oil in presence of an adsorbent wherein the content of alumina oxide is not more than 9.5 wt %, d) deodorizing the bleached oil at a deodorization temperature below 265° C., e) optionally re-bleaching the deodorized oil in presence of an acid-activated bleaching agent, f) optionally re-deodorizing the deodorized or re-bleached oil at a deodorization temperature below 200° C.

8. A method for using an adsorbent to mitigate or eliminate the formation of chloropropanol fatty acid esters in a process for producing deodorized vegetable oils selected from palm oil, palm oil based material and combinations thereof and wherein the adsorbent is having a content of alumina oxide not more than 9.5 wt %;

wherein the method comprises:
contacting the vegetable oil with the adsorbent, wherein the vegetable oil has not been subjected to a deodorization process.

9. The method according to claim 8 wherein the formation of chloropropanol fatty acid esters is mitigated or eliminated by mitigating or eliminating the content of precursors of chloropropanol fatty acid esters in a process for producing deodorized vegetable oils selected from palm oil, palm oil based material and combinations thereof and wherein the adsorbent is having a content of alumina oxide not more than 9.5 wt %.

10. The method according to claim 8 wherein the adsorbent is having a content of earth alkali oxides of from 12 to 27 wt %.

11. The method according to claim 8 wherein the adsorbent is non-chemically activated.

12. The method according to claim 8 wherein the adsorbent is having a content of magnesium oxide from 11 to 25 wt %.

13. The method according to claim 8 wherein the adsorbent is used in a bleaching step of the process for producing deodorized vegetable liquid oils selected from palm oil, palm oil based material and combinations thereof.

* * * * *